United States Patent Office 3,161,073
Patented Dec. 15, 1964

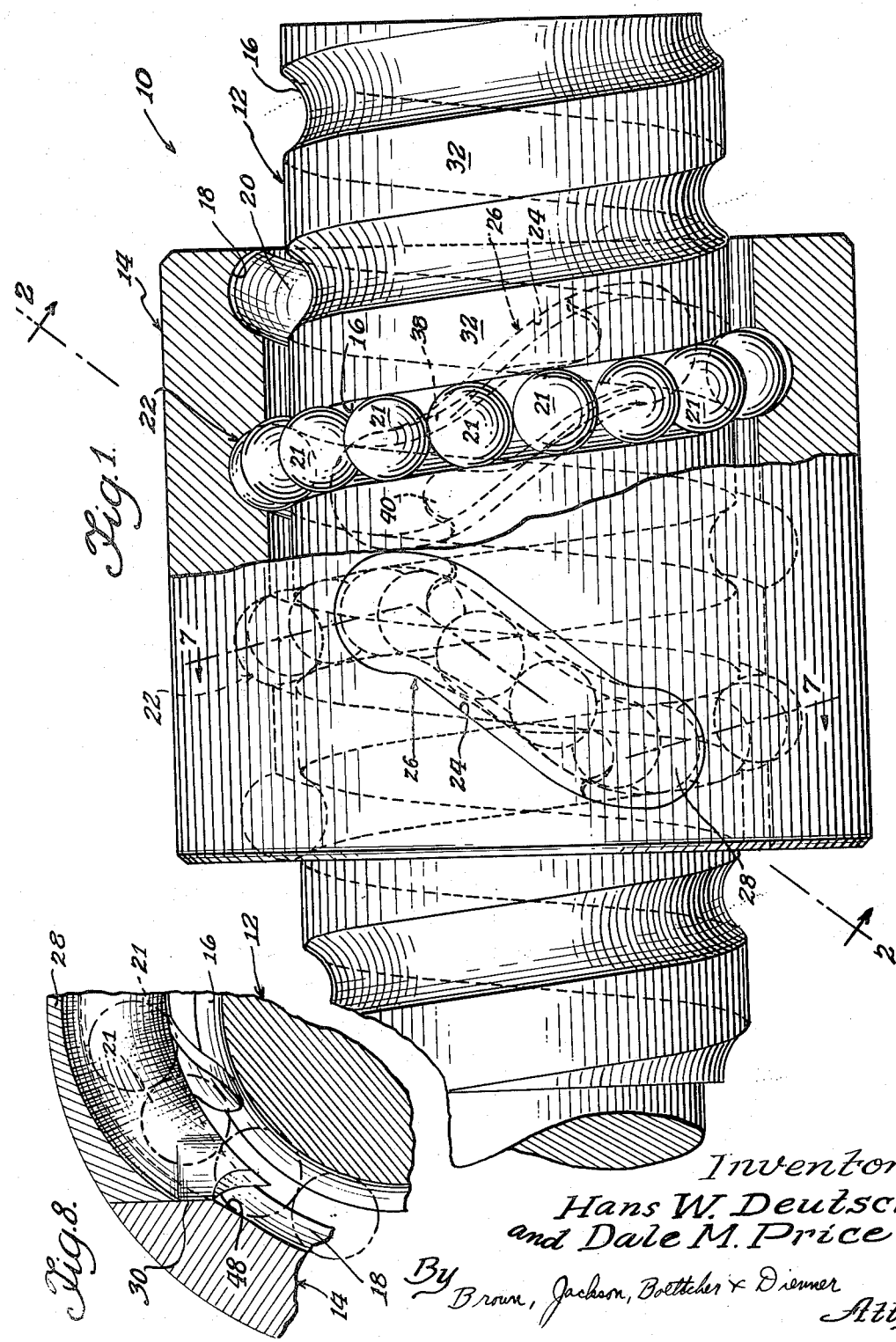

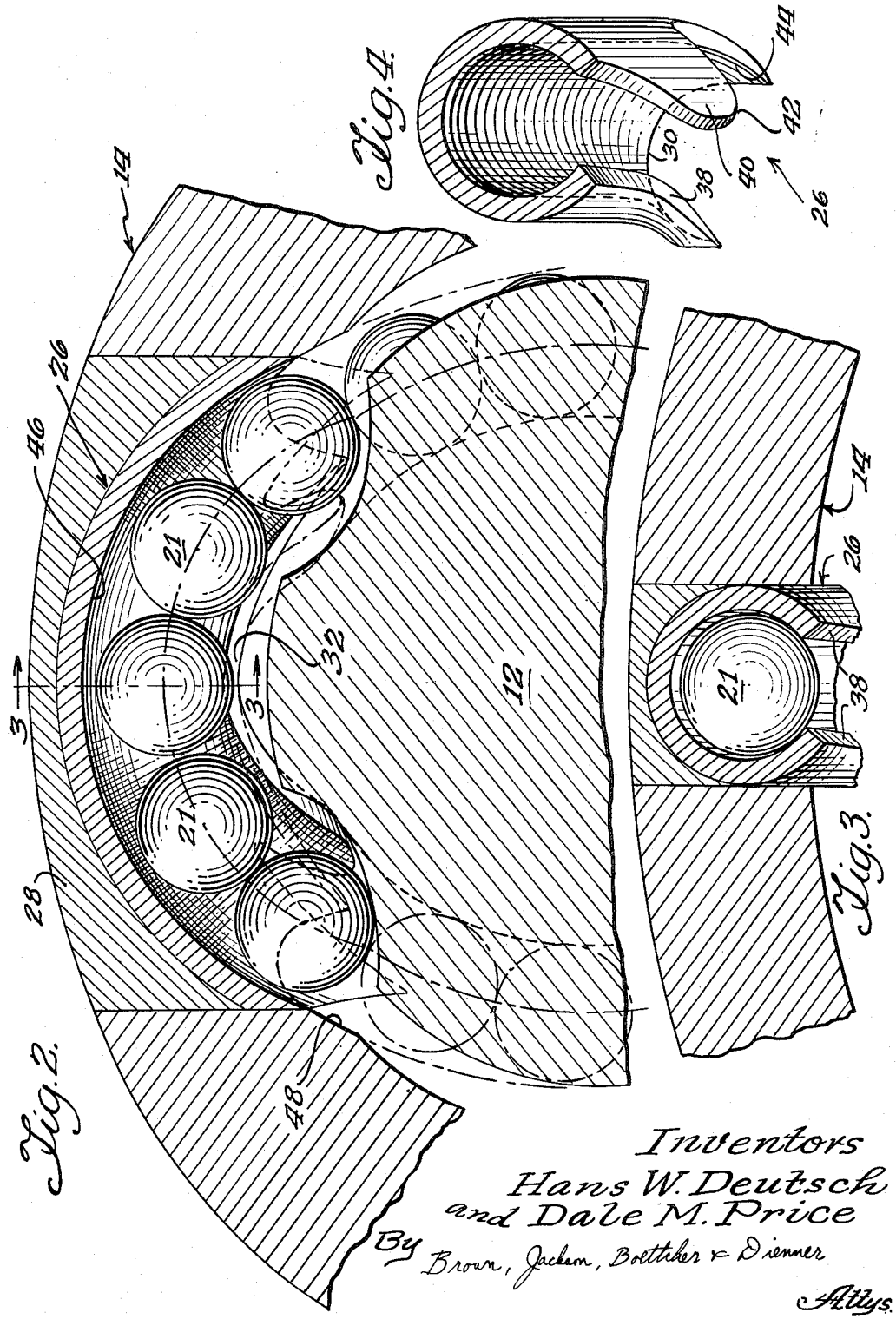

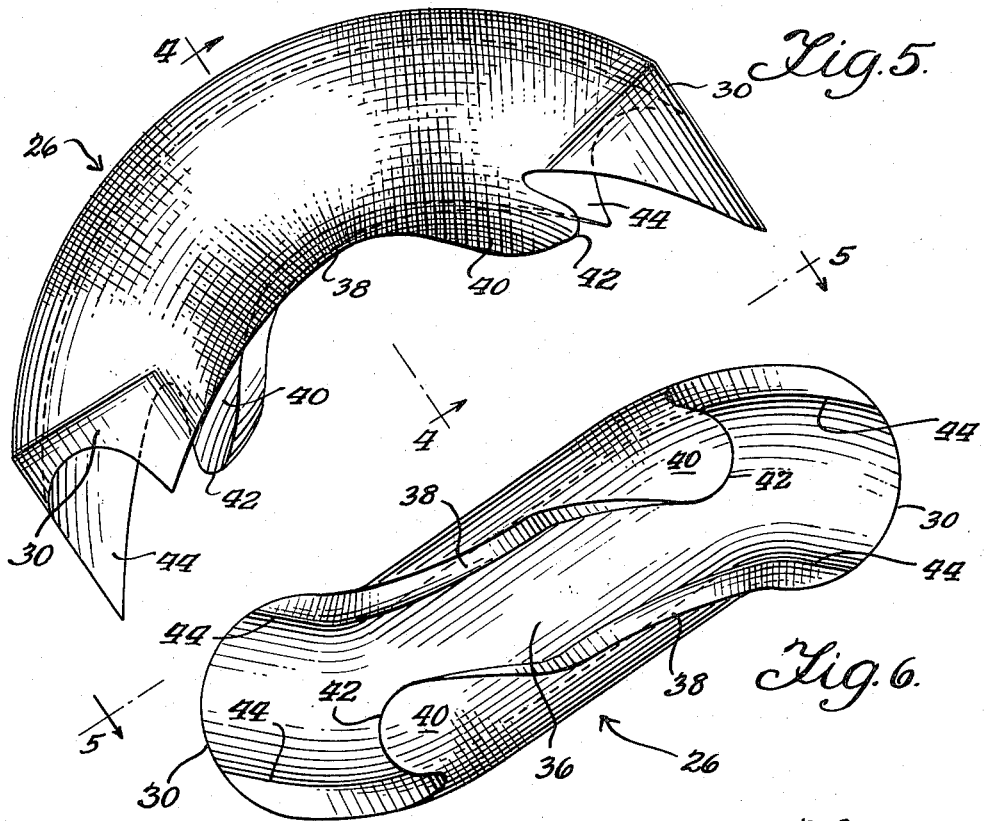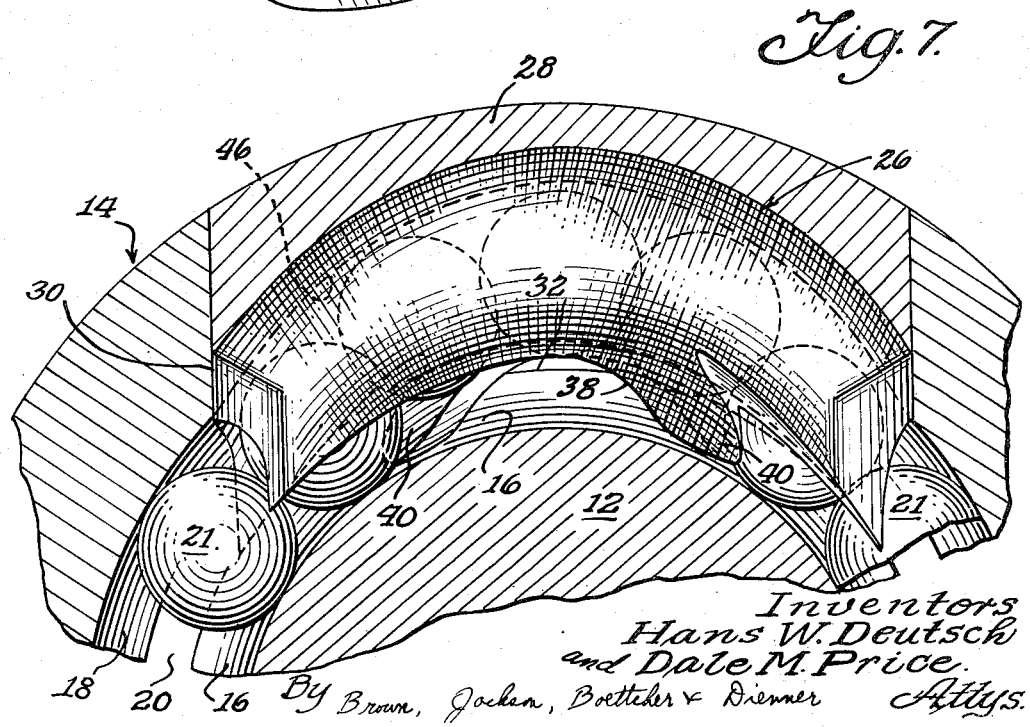

3,161,073
BALL SCREW MECHANISM
Hans W. Deutsch, Clarendon Hills, and Dale M. Price, Hinsdale, Ill., assignors to Scully-Jones and Company, Chicago, Ill., a corporation of Illinois
Filed Oct. 2, 1961, Ser. No. 142,394
5 Claims. (Cl. 74—424.8)

Our invention pertains broadly to a motion and force transmission mechanism adapted to convert rotary movement and force into longitudinal movement and force and vice versa. More particularly, the invention is directed to an improved ball screw mechanism comprising a nut member and a screw member which, by a groove in each, define between them a helical passage in which are disposed a plurality of balls for transmitting movement and force between the members.

In such ball screw mechanism, it is necessary to employ at least approximately one convolution of the helical passage having balls within it. More than one convolution may be employed but, regardless of the number, it is necessary to recirculate the balls from one end of the passage to the other end. This provides an endless series, or train, of balls which recirculate in one direction or the other depending upon the relative directions of rotation of the nut and screw members.

Many types of structures have been proposed, and some adopted, for transferring the balls from one end of the helical passage back to the other end in order to provide this endless series of balls. In one form, the balls are passed out through a hole in the wall of the nut member and directed along the outer surface of the wall and back in through another hole in the nut member to the other end of the passage. A common form of this structure comprises a pin or blocking element at opposite ends of the passage which serves to deflect on-coming balls in a direction either tangentially, or at an angle, relative to the passage and into a tube which is carried in a hole through the wall of the nut member. The tube then turns at a right angle and extends diagonally along the outer surface of the nut member to a position overlying the other end of the passage. Here the tube turns at a right angle again and passes through another hole in the nut member, terminating above the other end of the passage adjacent the other ball-deflecting element.

Such a structure has a number of defects. It increases the over-all size, radially, of the ball screw mechanism by adding the ball return tube onto the exterior surface of the nut member. Furthermore, with the tube in such exposed position on the exterior of the nut member, it is more subject to damage, as by denting, crushing or the like, which thereby renders the structure inoperative. Also, by reason of the right angle, or other, changes in direction of the balls when passing through the tube, the smooth flow of the balls is interfered with and a binding action may result.

Another form of ball screw mechanism which has been proposed has the ball return formed in the shaft of the screw member by a passageway ending adjacent the helical passage at its opposite ends and having pin means or other blocking members deflecting the balls from the helical passage into the passageway through the inner portions of the screw member. It is obvious that the manufacture of such a screw member with a passageway through its internal portions is difficult and expensive. It will be further apparent that in very small ball screw mechanisms there is no room in the screw member for such a passageway because of the large diameter of the balls relative to the diameter of the screw member.

Another general type of ball return structure is one in which there is a passageway through the interior of the nut member, instead of having the balls led outwardly through the wall of the nut member as described above. Here, too, the difficulty and expense of manufacturing such a passageway internally of the nut member's wall is apparent. As a consequence, a modification of the concept of having the ball return passageway internally of the wall of the nut member has been proposed wherein the passageway consists of a ball-return groove at the inner surface of the nut member which permits the balls to be deflected from the helical passage up and onto the surface of the intervening thread of the screw member and then back down into the adjacent convolution at the other end of the helical passage. While this has simplified manufacture of the structure, it has introduced other problems, amongst which is the frictional engagement between the balls and the thread of the screw member. Also, the different directions of movement between the nut member, screw member, and the balls passing through the ball return groove results in a conflicting direction of rotation being given to the balls, thereby causing additional friction, binding and wear.

It is an object of our invention to provide a ball screw mechanism which avoids the disadvantages of the prior structures enumerated above, and others, while at the same time providing certain new advantages. In accomplishing this, we provide a ball-return arrangement in which the balls are deflected smoothly and gradually thereby avoiding binding, friction and wear and providing a smooth operating mechanism having superior performance and long life.

We also provide a ball-return arrangement which is relatively inexpensive to manufacture compared with prior structures by providing a ball-return structure in the form of a tube-like member which is disposed in a milled out portion of the wall of the nut member, with said tube-like member being secured within said milled out portion, as in a recess. The tube-like member preferably is formed from sheet metal and so constructed as to be usable for movement of the balls in either direction with equal facility.

A further advantage of our ball screw mechanism is that it has a small over-all diameter not only by reason of having the ball-return means disposed within the wall of the nut member but also by having the ball-return means formed as a tube-like member having an opening along its portion which faces the screw member and traverses the crest of an intervening thread, or threads, thereby permitting suspension of the balls out of contact with the crest but closely adjacent to it. By having said opening, instead of the tube wall, between the balls and the crest, the diameter of the over-all ball screw mechanism can be reduced, thereby increasing the number of locations in which such a mechanism may be employed.

A further advantage of our ball-return arrangement is that it permits the nut member and screw member to fit more closely adjacent each other so that their respective grooves may more completely encompass the balls, thereby providing greater bearing surface between said members and the balls and thereby permitting greater forces to be transmitted.

Additional objects and advantages of our structure will become apparent from a consideration of the following description, when taken with the drawings in which:

FIGURE 1 is a side elevation of a ball screw mechanism of our invention on enlarged scale, with portions broken away to reveal certain inner structure;

FIGURE 2 is an enlarged, fragmentary, sectional view taken substantially on the line 2—2 of FIGURE 1;

FIGURE 3 is a sectional view taken substantially on the line 3—3 of FIGURE 2;

FIGURE 4 is a sectional view of the tube-like member of our ball-return means taken substantially on the line 4—4 of FIGURE 5;

FIGURE 5 is an enlarged side elevation of the tube-like ball-return means looking in the direction of the arrows 5—5 of FIGURE 6;

FIGURE 6 is a bottom plan view of the ball-return means;

FIGURE 7 is an enlarged sectional view taken substantially on the line 7—7 of FIGURE 1; and FIGURE 8 is a fragmentary, sectional view of the ball-return means with the balls shown merely in dotted outline.

Referring now to the drawings, in FIGURE 1 there may be seen the ball screw mechanism indicated generally by the reference numeral 10 which has a screw member 12 and a nut member 14. Screw member 12 has a helical groove 16 on its external surface and nut member 14 has a corresponding helical groove 18 on its inner surface. These two grooves together define a helical passage 20, in certain convolutions of which helical passage are disposed trains of balls 22.

In the illustrated nut member 14 there are two series of balls 22 each forming an endless train for interconnecting the nut member and screw member to permit transmission of motion and power between them. It will only be necessary to describe the operation of one of such trains of balls 22, since both function in the same manner.

On the left side of the nut member as viewed in FIGURE 1, there is a generally S-shaped opening 24, in plan, extending through the wall of the nut member 14. Fixed in said S-shaped opening is a corresponding ball-return means, identified generally by the reference numeral 26 and S-shaped in plan, which may be secured in the opening as by soldering, or other suitable means, the solder being indicated generally by the reference numeral 28 (see FIGURES 2, 7 and 8). A side elevational view of the ball return means 26 is shown in FIGURE 5 and a bottom plan view is shown in FIGURE 6.

A similarly shaped opening 24 is formed in the opposite side wall of the nut member 14 as shown in the right-hand portion of FIGURE 1, and it, too, has a ball-return means 26 secured in the opening by soldering or other suitable means. These ball-return means 26 at their ends 30 (FIGURES 2, 7 and 8) overlie adjacent convolutions of the helical groove 16 of the screw member while the portion intermediate the ends curves upwardly and over an intervening crest 32 of the screw member 12 at an angle of approximately 45° to the screw thread helix angle.

As may be most readily seen in FIGURE 6, ball return means 26 has an opening 36 at that portion which faces the crest 32 of the screw member 12. Preferably, the opening extends from one end of the ball-return means 26 to the other end.

In all instances where reference is made to a generally S-shape of the ball-return means, etc., it will be appreciated that it is a modified form of S, not having extreme curvatures of the ends as in the usual form of an S. As may be best seen in FIGURES 1 and 6, the ball-return means has two lateral curves, and (as may be best seen in FIGURES 2, 5 and 7) has a curve rising over the crest 32 of the screw member 12. A right hand thread is here illustrated, but the direction of the two lateral curves is just the opposite for left hand threads. All of these curves are very gradual in order not to have the balls 21 be deflected sharply as has been customary in most of the prior art devices. In the illustrated ball return means it will be observed that the radius of lateral curvature is no greater than the radius of curvature of the curved portion lifting the balls 21 over the crest 32 of the screw member 12.

Preferably, too, the ball-return means 26 is formed of sheet metal from a stamping. The blank is of such shape that it can be formed up to make a left-hand or right-hand ball-return. However, we do not limit our invention to the concept of a metal stamping, since other materials than metal might be used and since the ball-return means 26 might be molded or formed as a casting. We have found, however, that a sheet metal stamping is not only inexpensive from the point of view of the material used, but also requires no finishing operation such as may be required with castings.

Along the edges 38 which define the opening 36, which is less wide than the diameter of the balls, there are integral protrusions 40. As will be seen particularly from FIGURE 6, these protrusions 40, and the side edges and walls of which they form a part, are symmetrically but oppositely directed axially of the ball return means 26 and the protrusions are located inwardly from the ends 30 of the ball-return means 26.

As may be seen in FIGURES 2, 7 and 8, the protrusions 40 extend downwardly into the helical groove 16 of the screw member and the leading edges 42 of the protrusions 40 preferably lie closely adjacent the bottom of the grooves 16, rather than resting against the bottoms of the grooves. These protrusions confront the on-coming balls 21 of the train 22 and their leading edges 42 are so disposed as to engage each of the on-coming balls well below their pitch diameter and near their point of engagement with helical groove 16 to thereby easily elevate and guide them through the ball-return means 26 and over the crest 32 of the screw member 12. Then the protrusion 40 at the opposite end of the ball return means 26 smoothly deposits, or funnels, the balls into the adjoining convolution of the screw member 12.

From the protrusions 40 to the ends 30 of the ball-return means 26, the walls 44, at the edges 38 which define the opening 36, are spaced from each other a distance corresponding to the diameter of the helical passage 20. Also, as may be seen in FIGURES 2 and 7, the inside surface 46 of the ball-return means 26 has a radius of curvature, axially of the ball-return means which varies from that of the helical groove 18 of the nut member 14. As can be seen, the inner surface 46 curves away more rapidly from the screw member 12, thereby affording a relief area which relieves pressure on each successive ball as it enters the end of the ball return means 26 just prior to its reaching a protrusion 40. Protrusion 40 serves somewhat as a lifting finger for each ball, smoothly raising it from the groove 16 of the screw member 12. When the successive balls have reached the relief area and then been elevated by a protrusion 40, their smooth, gradual lateral movement begins and, as may be best seen in FIGURES 2 and 7, the ball is raised over and out of contact with the crest 32 of the screw member 12. Similarly, at the opposite end of the ball-return means 26 the balls departing from the ball-return means 26 are smoothly directed into the adjacent convolution of the helical groove 16 in the screw member 12, each ball reaching the helical groove 16 prior to its departure from the ball return means 26 and before entering a loaded zone between the nut member 14 and screw member 12.

At that location where the protrusion 40 begins to raise an on-coming ball 21 from groove 16, the tube-like shape of the ball-return means 26 is such that it partially encircles each ball, but without enclosing it in a complete tubular shape because of the opening 36 on that portion of the ball-return means 26 which faces the screw crest 32. As a result, the balls may be suspended at the edges 38 of the ball return means 26, as best shown in FIGURES 2 and 3. One advantage of this structure resides in the fact that the wall thickness of the tube is eliminated, thereby permitting the tube-like member and balls to more closely approach the screw member 12, since the balls extend part way through the wall of the ball-return means by reason of the opening 36. Hence, the outside over-all diameter of the ball screw mechanism can be made less and permit it to be used in more locations where space for the mechanism may be limited. The edges 36 also may provide a track-like guiding effect for the balls since there are two point contacts with each ball instead of merely one. The edges 38 suspend the balls as they pass over the crest 32 but out of contact with it, thereby avoiding friction with the crest. Since the direction of rotation of the crest 32 of the screw member will be different from the direction of rotation the balls are taking in the ball-return means, it is important to avoid having the balls contacted by the screw member, since the screw member would tend to give a conflicting direction of rotation to that which the ball tends to take.

A modification of the ball relief area is shown in FIGURES 2 and 8. There the ball relief area is not only immediately inward of the end 30 of the ball-return means 26 and in advance of engagement of the ball with a protrusion 40, but also extends forwardly of the end 30 into a portion of the wall of the nut member 14 at the area indicated by the numeral 48.

To briefly recapitulate, as each train of balls 22 circulates in the helical passage 20, the balls which come toward a protrusion 40 in the ball return means 26 are relieved of load prior to reaching the protrusion and then are engaged well beneath their pitch diameter by said protrusion, since the protrusion extends into and adjacent the bottom of the helical groove 16 of the screw member 12. The balls are thereby smoothly raised and then laterally directed over and out of engagement with the crest 32 of the screw member 12 and are then again smoothly and laterally turned and funneled into the helical groove 16 of the screw member 12 again and then put under load.

While we have illustrated a preferred embodiment of our invention, we do not intend to be limited thereto except insofar as the appended claims are so limited, since with our disclosure before them, various modifications and changes coming within the scope of our invention may occur to those skilled in the art.

We claim:

1. A ball screw mechanism comprising a screw member and a nut member each having a helical groove which grooves together define a helical passage, a train of balls in said passage permitting transmission of force between the members, an opening formed in the wall of said nut member so as to extend at an inclination relative to the axis of the mechanism between the ends of less than one helical groove convolution, and a ball return member fixedly mounted in said opening so as to be disposed within the confines of the outer diameter of said nut and having a wall portion defining a ball return passage for transferring the balls between said ends and over an intervening screw crest whereby said ball return member and said less than one helical groove convolution together define an endless path for the train of balls, said ball return member being disposed closely adjacent said intervening screw crest and said wall portion having an opening therein extending substantially along the length of the ball return in a radially inner portion thereof facing said screw member, said opening being less wide than the diameter of said balls whereby when due to gravity the balls are urged toward said screw the edges of said wall portion adjacent said opening will suspend the balls out of contact with the crest of said intervening screw thread while yet permitting them to move in a path closely adjacent said crest as the balls are directed thereover.

2. The ball screw mechanism of claim 1 wherein said ball return passage is generally S-shaped in plan.

3. The ball screw mechanism of claim 1 wherein adjacent each end of the ball return member a protrusion is formed on one of the edges defining the opening in the ball return which protrusion extends into the helical passage portion of the screw member and has a leading edge adapted to engage oncoming balls below their pitch diameter to elevate and guide them into the ball return passage at one end thereof and to direct them back into the helical groove at the other end thereof, and wherein said opening in said ball return member extends substantially along the entire length thereof from one of said protrusions to the other.

4. The ball screw mechanism of claim 1 wherein said opening formed in the wall of said nut extends at an angle of approximately 45 degrees relative to the axis of the mechanism.

5. The ball screw mechanism of claim 1 wherein said ball return member comprises a unitary sheet metal stamping formed to a tube-like shape so as to partially encircle a ball disposed therein but without enclosing it in a complete tubular shape due to said opening formed in the wall portion facing said screw member.

References Cited in the file of this patent

UNITED STATES PATENTS

| | | |
|---|---|---|
| 2,166,106 | Gormly | July 18, 1939 |
| 2,851,897 | Cochrane | Sept. 16, 1958 |
| 2,895,343 | Orner | July 21, 1959 |
| 2,995,948 | Galonska | Aug. 15, 1961 |